United States Patent
Zaschke et al.

(12) 
(10) Patent No.: US 6,337,356 B1
(45) Date of Patent: *Jan. 8, 2002

(54) PRODUCTION OF SOUND-ABSORBING POLYURETHANE FOAMS HAVING AN ADHESIVE SURFACE

(75) Inventors: Bernd Zaschke, Dresden; Kirsten Schmaler, Finsterwalde; Peter Falke, Schwarzheide, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,179

(22) Filed: May 24, 2000

(30) Foreign Application Priority Data

May 29, 1999 (DE) .......................................... 199 24 804

(51) Int. Cl.$^7$ ............................................... C08G 18/14
(52) U.S. Cl. ...................... 521/174; 521/137; 521/159; 521/914
(58) Field of Search ................................. 521/137, 159, 521/174, 914

(56) References Cited

U.S. PATENT DOCUMENTS 5,420,170 A * 5/1995 Lutter et al. ................. 521/174
5,814,676 A * 9/1998 Jacobs et al. ............... 521/174

* cited by examiner

*Primary Examiner*—John M. Cooney, Jr.
(74) *Attorney, Agent, or Firm*—Fernando A. Borrego; Mary K. Cameron

(57) ABSTRACT

In a process for producing sound-absorbing PUR foams having an adhesive surface by reacting organic and/or modified organic polyisocyanates (a) with a polyetherol mixture (b) and, if desired, further compounds (c) bearing hydrogen atoms which are reactive toward isocyanates, in the presence of water and/or other blowing agents (d), catalysts (e) and, if desired, further auxiliaries and additives (f), the polyetherol mixture (b) comprises b1) at least one bifunctional to eight-functional polyetherol based on ethylene oxide and propylene oxide and having an OH number of from 20 to 80 mg KOH/g and a proportion of primary OH groups of >50%, b2) at least one polyetherol based on ethylene oxide and propylene oxide and/or butylene oxide and a bifunctional to eight-functional initiator and having an OH number of from 20 to 80 mg KOH/g, where the proportion of ethylene oxide in the polyetherol is >30% by weight, in amounts of from 10 to 50 parts by weight, and b3) at least one polyetherol based on propylene oxide and/or butylene oxide and, if desired, ethylene oxide and a bifunctional to eight-functional initiator and having an OH number of from 30 to 400 mg KOH/g, where the proportion of ethylene oxide in the polyetherol is <30% by weight.

The sound-absorbing PUR foams produced by this process can be used as damping material.

13 Claims, No Drawings

PRODUCTION OF SOUND-ABSORBING POLYURETHANE FOAMS HAVING AN ADHESIVE SURFACE

The present invention relates to a process for producing sound-absorbing PUR foams having an adhesive surface by reacting organic and/or modified organic polyisocyanates (a) with a polyetherol mixture (b) and, if desired, further compounds (c) bearing hydrogen atoms which are reactive toward isocyanates, in the presence of water and/or other blowing agents (d), catalysts (e) and, if desired, further auxiliaries and additives (f), wherein a specific polyetherol mixture is used.

The production of polyurethanes (PURs) by reacting organic polyisocyanates with compounds having at least two reactive hydrogen atoms, for example polyoxyalkylenepolyamines and/or preferably organic polyhydroxyl compounds, in particular polyetherols having molecular weights of, for example, from 300 to 6000, and, if desired, chain extenders and/or crosslinkers having molecular weights of up to about 400 in the presence of catalysts, blowing agents, flame retardants, auxiliaries and/or additives is known and has been described many times. A summary overview of the production of PUR is given in, for example, Kunststoffhandbuch, Volume VII, Polyurethane, Carl-Hanser-Verlag, Munich, 1st edition 1966, edited by Dr. R. Vieweg and Dr. A. Höchtlen, and 2nd edition 1983 and 3rd edition 1993, edited by Dr. G. Oertel.

The main area of application for cold-cure flexible foams is upholstery elements for the furniture industry and seat elements for the automobile industry. In addition, numerous flexible PUR foams are used for sound-damping purposes, e.g. automobile carpets.

The open-pore foam framework offers favorable prerequisites for airborne sound absorption. The damping behavior of flexible foams, which can be described, for example, by the loss factor $\eta$, is regarded in numerous publications as a parameter for optimizing sound damping. The loss factor $\eta$ $$\eta = W_t/2\pi W_r$$

indicates the proportion of sound which is irreversibly converted into heat during an oscillation period. High loss factors accordingly effect higher sound damping.

A number of publications describe sound-absorbing, flexible PUR foams, but these do not have an adhesive carpet surface.

Thus, DE-A-2751774 describes a sound-damping composite system based on a combination of rigid foam polyols and flexible foam polyols having a high proportion of fillers, which has an adverse effect on the weight per unit area of the workpiece.

EP-A-433878 discloses carpet foams having viscoelastic properties. These comprise a special combination of hydrophilic and hydrophobic polyols. These systems have good sound absorption performance, but demix after a short time during storage if they are not permanently stirred. DE-A-3942330 likewise describes specific polyol mixtures for producing such viscoelastic foams.

EP-A-331941 claims acoustic foams having a loss factor of >0.5. These foams are produced by means of a combination of specific hydrophilic and hydrophobic polyetherols. According to DE-A-4001044, sound-absorbing properties can be achieved by means of a combination of polyester alcohols and polyether alcohols. These systems have a very strong tendency to demix.

In a few cases, attempts have been made to achieve an adhesive surface character of the foams by means of special processing, in particular substantial under-crosslinking. Here, foaming is generally carried out at an index of from about 60 to 80. (The index indicates the equivalence ratio of the isocyanate component to the polyol component.) Thus, DE-A-3710731 describes such a flexible foam having sound-insulating properties. These carpet elements which are manufactured at relatively high foam densities are produced with an adhesive surface. The adhesive surface properties, which are achieved as a particular advantage, require foaming in an index region <80, preferably about 70.

DE-A-3510932 describes a relatively complicated method of subsequently providing a foam with an adhesive coating. DE-A-4129666 uses incompatible polyols which slowly demix. The high proportions of polyols rich in ethylene oxide and adherence to indexes of <80 enable an adhesive carpet surface to be achieved.

The inventions disclosed in the prior art all allow the production of flexible foams having sound-absorbing properties and an adhesive surface, but there is still considerable room for improvement in terms of the properties and processability of this class of materials. In particular, it should be noted that at the indexes of <80, frequently <70, required according to the prior art, the mechanical properties of the carpets are frequently unsatisfactory.

It is an object of the present invention to produce sound-absorbing, easy-to-process, flexible PUR foams having a loss factor of >0.3 and an adhesive surface.

We have found that this object is achieved by using a polyetherol mixture (b) comprising b1) at least one bifunctional to eight-functional polyetherol based on ethylene oxide and propylene oxide and having an OH number of from 20 to 80 mg KOH/g and a proportion of primary OH groups of >50%, b2) at least one polyetherol based on ethylene oxide and propylene oxide and/or butylene oxide and a bifunctional to eight-functional initiator and having an OH number of from 20 to 80 mg KOH/g, where the proportion of ethylene oxide in the polyetherol is >30% by weight, in amounts of from 10 to 50 parts by weight, and b3) at least one polyetherol based on propylene oxide and/or butylene oxide and, if desired, ethylene oxide and a bifunctional to eight-functional initiator and having an OH number of from 30 to 400 mg KOH/g, where the proportion of ethylene oxide in the polyetherol is <30% by weight, for producing the sound-absorbing PUR foams.

The present invention accordingly provides a process for producing sound-absorbing polyurethane foams having an adhesive surface by reacting organic and/or modified organic polyisocyanates (a) with a polyetherol mixture (b) and, if desired, further compounds (c) bearing hydrogen atoms which are reactive toward isocyanates, in the presence of water and/or other blowing agents (d), catalysts (e) and, if desired, further auxiliaries and additives (f), wherein the polyetherol mixture (b) comprises b1) at least one bifunctional to eight-functional polyetherol based on ethylene oxide and propylene oxide and having an OH number of from 20 to 80 mg KOH/g and a proportion of primary OH groups of >50%, b2) at least one polyetherol based on ethylene oxide and propylene oxide and/or butylene oxide and a bifunctional to eight-functional initiator and having an OH number of from 20 to 80 mg KOH/g, where the proportion of ethylene oxide in the polyetherol is >30% by weight, in amounts of from 10 to 50 parts by weight, and b3) at least one polyetherol based on propylene oxide and/or butylene oxide and, if desired, ethylene oxide and a bifunctional to eight-functional initiator and having an OH number of from 30 to 400 mg KOH/g, where the proportion of ethylene oxide in the polyetherol is <30% by weight, The invention further provides the sound-absorbing PUR foams produced by this process and provides for their use as damping material.

In our investigations we surprisingly found that the use of the specific polyetherol mixture employed according to the present invention makes it possible to produce flexible PUR foams which have good sound-absorbing properties, are easy to process and have a high loss factor of >0.3 and an adhesive surface.

The following may be said about the components used according to the present invention in the polyol mixture:

Constituent (b1) comprises at least one bifunctional to 8-functional polyetherol based on ethylene oxide and propylene oxide and having an OH number of from 20 to 80 mg KOH/g and a proportion of primary OH groups of >50%, preferably >70%.

Examples are: polyetherols based on glycerol, trimethylolpropane and sorbitol as initiator substances and having a propylene oxide block and an ethylene oxide end cap, by means of which the content of primary OH groups can be reliably brought to proportions of >50%. Preference is given to using block copolyetherols based on propylene oxide and ethylene oxide having an ethylene oxide end cap of >10% by weight. The polyetherols prepared in this way preferably have a proportion of primary OH groups of >70%.

The constituent (b1) is preferably used in an amount of from 30 to 70 parts by weight, particularly preferably from 40 to 60 parts by weight, in each case based on the components b) to f).

Constituent (b2) comprises at least one polyetherol based on ethylene oxide and propylene oxide and/or butylene oxide and a bifunctional to eight-functional initiator substance and having an OH number of from 20 to 80 mg KOH/g, where the proportion of ethylene oxide in the polyetherol is >30% by weight, preferably >50% by weight. These polyetherols preferably have a proportion of primary OH groups of >50%, preferably >70%.

Examples are: polyetherols based on glycerol, trimethylolpropane or pentaerythritol as initiator substance. They have an ethylene oxide end cap of >10% by weight. Preference is given to using polyetherols having proportions of ethylene oxide of >70% by weight, particularly preferably polyetherols based on glycerol and having an OH number of <50 mg KOH/g.

The constituent (b2) is used in an amount of from 10 to 50 parts by weight, preferably from 20 to 50 parts by weight, in each case based on the components b) to f).

Constituent (b3) comprises at least one polyetherol based on propylene oxide and/or butylene oxide and, if desired, ethylene oxide and a bifunctional to eight-functional initiator substance and having an OH number of from 30 to 400 mg KOH/g, preferably from 50 to 300 mg KOH/g, where the proportion of ethylene oxide in the polyetherol is <30% by weight, preferably <5% by weight. The proportion of secondary OH groups is preferably more than 90%.

Examples are: polyetherols based on propylene oxide and bifunctional initiator substances such as propylene glycol or water. An ethylene oxide end cap of <5% by weight may be present. Preference is given to using mixtures of lower propylene glycols.

The constituent (b3) is preferably used in an amount of from 5 to 20 parts by weight, based on the components b) to f).

The abovementioned polyetherols are prepared by known methods as are described by way of example further below.

The novel sound-absorbing PUR foams having an adhesive surface are produced by reacting organic and/or modified organic polyisocyanates (a) with the above-described polyetherol mixture (b) and, if desired, further compounds (c) bearing hydrogen atoms which are reactive toward isocyanates, in the presence of water, and/or other blowing agents (d), catalysts (e) and, if desired, further auxiliaries and additives (f).

As regards the further starting components which can be used, the following details may be provided:

Suitable organic and/or modified organic polyisocyanates (a) are the aliphatic, cycloaliphatic, araliphatic and preferably aromatic polyfunctional isocyanates known per se.

Specific examples are: alkylene diisocyanates having from 4 to 12 carbon atoms in the alkylene radical, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of their mixtures. Particular preference is given to mixtures of polyphenylpolymethylene polyisocyanate with MDI, in which the proportion of 2,4'-MDI is preferably >30% by weight.

Use is frequently also made of modified polyfunctional isocyanates, i.e. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples of suitable modified isocyanates are: modified diphenylmethane 4,4'-diisocyanate, modified diphenylmethane 4,4' and 2,4'-diisocyanate mixtures, modified crude MDI or tolylene 2,4- or 2,6-diisocyanate, organic, preferably aromatic, polyisocyanates containing urethane groups and having NCO contents of from 43 to 15% by weight, preferably from 31 to 21% by weight, based on the total weight, for example reaction products with low molecular weight diols, triols, dialkylene glycols, trialkylene glycols or polyoxyalkylene glycols having molecular weights up to 6000, in particular up to 1500, where these dialkylene or polyoxyalkylene glycols can be used individually or as mixtures. Examples which may be mentioned are: diethylene glycol, dipropylene glycol, polyoxyethylene, polyoxypropylene and polyoxypropylene-polyoxyethene glycols, triols and/or tetrols. Also suitable are prepolymers containing NCO groups, having NCO contents of from 25 to 3.5% by weight, preferably from 21 to 14% by weight, based on the total weight, and prepared from the polyester polyols and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or crude MDI. Particular preference is given to prepolymers formed by reaction of the abovementioned isocyanates with the polyetherols b1 to b3. Further modified isocyanates which have been found to be useful are liquid polyisocyanates containing carbodiimide groups and/or isocyanurate rings and having NCO contents of from 43 to 15% by weight, preferably from 31 to 21% by weight, based on the total weight, e.g. ones based on diphenylmethane 4,4'-, 2,4'- and/or 2,2'-diisocyanate and/or tolylene 2,4- and/or 2,6-diisocyanate.

The modified polyisocyanates may be mixed with one another or with unmodified organic polyisocyanates such as diphenylmethane 2,4'- and/or 4,4'-diisocyanate, crude MDI, tolylene 2,4- and/or 2,6-diisocyanate.

Organic polyisocyanates which have been found to be particularly useful and are therefore preferably employed are: mixtures of tolylene diisocyanates and crude MDI or mixtures of modified organic polyisocyanates containing urethane groups and having an NCO content of from 33.6 to 15% by weight, in particular those based on tolylene diisocyanates, diphenylmethane 4,4'-diisocyanate, diphenylmethane diisocyanate isomer mixtures or crude MDI, in particular crude MDI having a diphenylmethane diisocyanate isomer content of from 30 to 80% by weight.

In addition to the above-described polyetherol mixture (b) employed according to the present invention, use may be made, if desired, of further compounds (c) bearing hydrogen atoms which are reactive toward isocyanates.

For this purpose, compounds having at least two reactive hydrogen atoms are predominantly used. It is advantageous to select ones having a functionality of from 2 to 8, preferably from 2 to 3, and a molecular weight of from 300 to 8000, preferably from 300 to 5000.

According to the present invention, preference is given to using polyols, in particular polyether polyols. It is also possible to use, for example, polyetherpolyamines and/or further polyols selected from the group consisting of polyester polyols, polythioether polyols, polyesteramides, hydroxyl-containing polyacetals and hydroxyl-containing aliphatic polycarbonates or mixtures of at least two of the polyols mentioned. The hydroxyl number of the polyhydroxyl compounds is generally from 20 to 80 and preferably from 28 to 56.

The polyether polyols used in the components (b) and (c) are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8, preferably 2 or 3, reactive hydrogen atoms in bound form or by cationic polymerization using Lewis acids such as antimony pentachloride, boron fluoride etherate, etc., or bleaching earth as catalysts. For specific applications monofunctional initiators can also be incorporated in the polyether structure.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures.

Examples of suitable initiator molecules are: water, organic dicarboxylic acids such as succinic acid, adipic acid, phthalic acid and terephthalic acid, aliphatic and aromatic, unalkylated or N-monoalkylated, N,N- and N,N'-dialkylated diamines having from 1 to 4 carbon atoms in the alkyl radical, for example unalkylated, monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-toluenediamine and 4,4'-, 2,4'- and 2,2'-diaminodiphenylmethane. Further suitable initiator molecules are: alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using polyhydric, in particular dihydric and/or trihydric, alcohols such as ethanediol, 1,2- and 2,3-propanediol, diethylene glycol, dipropylene glycol, 1,4-butanediol, 1,6-hexanediol, glycerol, trimethylolpropane, pentaerythritol.

Further suitable polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, e.g. in a weight ratio of from 90:10 to 10:90, preferably from 70:30 to 30:70, advantageously in the abovementioned polyether polyols by methods similar to those described in the German Patents 1111394, 1222669 (U.S. Pat. No. 3304273, 3383351, 3523093), 1152536 (GB 1040452) and 1152537 (GB 987618) and also polyether polyol dispersions which comprise as disperse phase, usually in an amount of from 1 to 50% by weight, preferably from 2 to 25% by weight: e.g. polyureas, polyhydrazides, polyurethanes containing bound tert-amino groups and/or melamine and are described, for example, in EP-B-011752 (U.S. Pat. No. 4,304,708), U.S. Pat. No. 4,374,209 and DE-A-3231497.

The polyether polyols can be used individually or in the form of mixtures.

Suitable polyester polyols can be prepared by customary methods, for example from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. The organic polycarboxylic acids and/or derivatives and polyhydric alcohols are advantageously polycondensed in a molar ratio of 1:1–1.8, preferably 1:1.05–1.2, in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C., at atmospheric pressure or under reduced pressure to the desired acid number which is advantageously less than 10, preferably less than 2.

The polyurethane foams can be produced with or without concomitant use of chain extenders and/or crosslinkers, but these are generally not necessary. Chain extenders and/or crosslinkers which can be used are diols and/or triols having molecular weights of less than 400, preferably from 60 to 300. Examples of suitable chain extenders/crosslinkers are aliphatic, cycloaliphatic and/or araliphatic diols having from 2 to 14, preferably from 4 to 10, carbon atoms, for example ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, triethanolamine, diethanolamine, glycerol and trimethylolpropane and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are employed for producing the polyurethane foams, they are advantageously used in an amount of up to 5% by weight, based on the weight of the polyol compound.

As blowing agents (d), it is possible to use the chlorofluorocarbons (CFCs) and highly fluorinated and/or perfluorinated hydrocarbons generally known from polyurethane chemistry. However, the use of these materials has been greatly restricted or completely stopped for ecological reasons. Apart from HCFCs and HFCs, possible alternative blowing agents are, in particular, aliphatic and/or cycloaliphatic hydrocarbons, in particular pentane and cyclopentane, or acetals such as methylal. These physical blowing agents are usually added to the polyol component of the system. However, they can also be added to the isocyanate component or, as a combination, both to the polyol component and to the isocyanate component. They can also be used together with highly fluorinated and/or perfluorinated hydrocarbons in the form of an emulsion of the polyol component. If emulsifiers are employed, use is usually made of oligomeric acrylates which contain bound polyoxyalkylene and fluoroalkane radicals as side groups and have a fluorine content of from about 5 to 30% by weight. Such products are well known from plastics chemistry, e.g. from EP-A-351614.

The amount of blowing agent or blowing agent mixture used is from 1 to 25% by weight, preferably from 1 to 15% by weight, in each case based on the weight of the components (b) to (f).

It is also possible and especially in the case of flexible foam customary to add water as blowing agent to the polyol component in an amount of from 0.5 to 15% by weight, preferably from 1 to 5% by weight, based on the weight of the components (b) to (f). The addition of water can be combined with the use of the other blowing agents described.

Catalysts (e) used for producing the polyurethane foams are, in particular, compounds which strongly accelerate the reaction of the reactive hydrogen atoms, in particular hydroxyl-containing compounds, of the components (b) and (c) with the organic, modified or unmodified polyisocyanates (a). Possible catalysts are organic metal compounds, preferably organic tin compounds such as tin(II) salts of organic carboxylic acids, e.g. tin(II) acetate, tin(II) octoate, tin(II) ethylhexanoate and tin(II) laurate, and the dialkyltin (IV) salts of organic carboxylic acids, e.g. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl) ether, bis(dimethylaminopropyl) urea, dimethylpiperazine, 1,2-dimethylimidazole, 1-azabicyclo[3.3.0]octane and preferably 1,4-diazabicyclo[2.2.2]octane, and aminoalkanol compounds such as triethanolamine, triisopropanolamine, N-methyldiethanolamine and N-ethyldiethanolamine and dimethylethanolamine. Further suitable catalysts are: tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the components (b) to (f).

If desired, further auxiliaries and/or additives (f) can be incorporated into the reaction mixture for producing the sound-absorbing polyurethane foams of the present invention. Examples which may be mentioned are surface-active substances, foam stabilizers, cell regulators, fillers, dyes, pigments, flame retardants, hydrolysis inhibitors, fungistatic and bacteriostatic substances. Suitable flame retardants are, for example, tricresyl phosphate, tris(2-chloroethyl) phosphate, tris(2-chloropropyl) phosphate, tetrakis(2-chloroethyl) ethylene diphosphate, dimethyl methanephosphonate, diethyl diethanolaminomethylphosphonate and also commercial halogen-containing flame retardant polyols. Apart from the abovementioned halogen-substituted phosphates, it is also possible to use inorganic or organic flame retardants such as red phosphorus, hydrated aluminum oxide, antimony trioxide, arsenic oxide, ammonium polyphosphate and calcium sulfate, expandable graphite or cyanuric acid derivatives such as melamine, or mixtures of at least two flame retardants, e.g. ammonium polyphosphate melamine and also, if desired, maize starch or ammonium polyphosphate, melamine and expandable graphite and/or aliphatic or aromatic polyesters, for making the polyisocyanate polyaddition products flame resistant. Additions of melamine have been found to be particularly effective. In general, it has been found to be advantageous to use from 5 to 50 parts by weight, preferably from 5 to 25 parts by weight, of the flame retardants mentioned per 100 parts by weight of the components (b) to (f).

Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or fatty acids and also amine salts of fatty acids, e.g. diethylamine oleate, diethanolamine stearate, diethanolamine ricinoleate, salts of sulfonic acids, e.g. alkali metal or ammonium salts of dodecylbenzene- or dinaphthyl-methanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil and cell regulators such as paraffin, fatty alcohols and dimethylpolysiloxanes. The surface-active substances are usually employed in amounts of from 0.01 to 5 parts by weight, based on 100 parts by weight of the components (b) to (f).

For the purposes of the present invention, fillers, in particular reinforcing fillers, are the customary organic and inorganic fillers, reinforcing materials, weighting agents, agents for improving the abrasion behavior in paints, weighting compositions, etc., known per se. Specific examples are: inorganic fillers such as siliceous minerals, for example sheet silicates such as antigorite, serpentine, hornblendes, amphiboles, chrysotile and talc, metal oxides such kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may be coated with a size. Examples of suitable organic filters are: carbon, rosin, cyclopentadienyl resins and graft polymers and also cellulose fibers, polyamide, polyacrylonitrile, polyurethane and polyester fibers based on aromatic and/or aliphatic dicarboxylic esters and, in particular, carbon fibers. The inorganic and organic fillers can be used individually or as mixtures and are advantageously incorporated into the reaction mixture in amounts of from 0.5 to 50% by weight, preferably from 1 to 40% by weight, based on the weight of the components (a) to (f), although the content of mats, nonwovens and woven fabrics of natural and synthetic fibers may be up to 80% by weight.

Further details regarding the abovementioned other customary auxiliaries and additives may be found in the specialist literature, for example the monograph by J. H. Saunders and K. C. Frisch, "High Polymers" Volume XVI, Polyurethanes, Parts 1 and 2, Interscience Publishers 1962 and 1964, or the above-cited Kunststoffhandbuch, Polyurethane, Volume VII, Hanser-Verlag Munich, Vienna, 1st to 3rd editions.

The novel sound-absorbing PUR foams having an adhesive surface are produced by reacting the organic and/or modified organic polyisocyanates (a), the polyetherol mixture (b) and, if desired, further compounds (c) bearing hydrogen atoms which are reactive toward isocyanates in such amounts that the equivalence ratio of NCO groups of the polyisocyanates (a) to the sum of the reactive hydrogen atoms of the components (b) and, if used, (c) is 0.70–1.25:1, preferably 0.90–1.15:1.

Polyurethane foams produced by the process of the present invention are advantageously produced by the one-shot method, for example using the high-pressure or low-pressure technique, in open or closed molds, for example metallic molds. The continuous application of the reaction mixture to suitable conveyor belts for producing slabstock foams is also customary.

It has been found to be particularly advantageous to employ the two-component method and to combine the formative components (b) to (f) to give a polyol component, often also referred to as component A, and to use the organic and/or modified organic polyisocyanates (a), particularly preferably an NCO prepolymer or mixtures of this prepolymer and further polyisocyanates, and, if desired, blowing agents (d) as isocyanate component, often also referred to as component B.

The starting components are mixed at from 15 to 90° C., preferably from 20 to 60° C. and in particular from 20 to 35° C., and introduced into the open mold or under atmospheric pressure or superatmospheric pressure into the closed mold or, in the case of a continuous workstation, to a belt which accommodates the reaction mixture. Mixing can be carried out chemically by means of a stirrer, by means of a stirring screw or by high-pressure mixing in a nozzle. The mold temperature is advantageously from 20 to 110° C., preferably from 30 to 60° C. and in particular from 35 to 55° C.

To be able to remove the foam from the mold without problems, it is generally necessary to use mold release agents. For environmental reasons, use is increasingly made of concentrated mold release agents having low solvent contents or mold release agents based on water. Good results are achieved, for example, using aqueous mold release agents based on special waxes, e.g. Ewomold® 5715 (Eckert & Woelk, Welgesheim) or Acmos® 37-5081 (Acmos Chemie, Bremen).

The PUR foams produced by the process of the present invention (acoustic foams) have a density of from 10 to 800 kg/m$^3$, preferably from 60 to 100 kg/m$^3$. They are sound-absorbing and have an adhesive surface.

The adhesivity is determined on 24 hour-old test specimens (5×5×3 cm; stored at 23° C., 50% relative atmospheric humidity). After pressing the test specimens together (10 N, 1 min) between two polished steel plates, the force and displacement values are set to zero. A tensile test (100 mm/min) is subsequently carried out. Here, the force-displacement curve is recorded and the maximum force is determined. The adhesivity of the PUR foams of the present invention is preferably >30 N.

The sound absorption is defined by the loss factor which is determined in accordance with ISO 7626, parts 1 and 2. The PUR foams produced by the process of the present invention have a loss factor of greater than 0.3.

They are particularly suitable as material for sound-damping purposes.

The present invention is illustrated by the examples, without, however, being restricted thereby.

EXAMPLES

A polyol composition (see Table 1) was foamed with a prepolymer based on diphenylmethane diisocyanate (MDI) derivatives and a polyetherol based on ethylene oxide and propylene oxide (OH number=42 mg KOH/g) and having an NCO content of 28.9% by weight, at the index indicated in each case.

TABLE 1

Composition of the acoustic foams

| Component (in parts by weight) | Example 1 | Example 2 | Example 3 | Comparison 4 | Comparison 5 |
|---|---|---|---|---|---|
| Lu 2040 | 5.00 | 7.10 | 12.20 | 78.20 | 81.80 |
| Lu 2042 | 38.40 | 39.20 | 49.40 | 3.20 | |
| Lu 2047 | 37.75 | 38.10 | 28.85 | 4.20 | |
| Lu 1200 | 15.20 | 12.05 | 6.20 | | 3.00 |
| Lu 4100 | | | | | 8.00 |
| Triethanolamine | 0.30 | | | 0.40 | 1.40 |
| Glycerol | | | | | 0.70 |
| Lu N201 | 0.45 | 0.50 | 0.40 | 0.35 | 0.30 |
| Lu N206 | 0.20 | 0.20 | 0.20 | 0.22 | 0.20 |
| B 4690 | 0.30 | 0.35 | | | |
| L 3002 | | | 0.35 | | |
| B 8680 | | | | 0.95 | 1.10 |
| Water | 2.40 | 2.50 | 2.40 | 3.20 | 3.50 |
| MR 100: | 47 | 46 | 45 | | |
| Mold release agent | 1 | 1 | 3 | 1 | 2 |
| Pore diameter ($\mu$m) | >5 | <10 | <5 | <5 | >70 |
| Adhesivity (N) | 33 | 32 | 35 | 13 | 15 |

Lupranol® 2040: OH number = 28 mg KOH/g, polyether alcohol based on propylene oxide and ethylene oxide (BASF),
Lupranol® 2042: OH number = 27 mg KOH/g, polyether alcohol based on propylene oxide (BASF),
Lupranol® 2047: OH number = 42 mg KOH/g, polyether alcohol based on propylene oxide and ethylene oxide (81% by weight) (BASF),
Lupranol® 1200: OH number = 250 mg KOH/g, polyether alcohol based on propylene oxide (BASF),
Lupranol® 4100: OH number = 25 mg KOH/g, graft polyether alcohol (BASF),
Lupragen® N 201: amine catalyst (BASF),
Lupragen® N 206: amine catalyst (BASF),
B 4690, B 8680: silicone stabilizers (Goldschmidt),
L 3002: silicone stabilizer (OSi),
Mold release agent 1: Ewomold® 5715 (Eckert & Woelk, Welgesheim),
Mold release agent 2: Klüberpur® 918K (Klüber Chemie, Maisach-Gerlinden),
Mold release agent 3: 3 Acmos ® 37-5081 (Acmos Chemie, Bremen).

The properties measured on the acoustic foams are summarized in Table 2.

TABLE 2

Properties of the acoustic foams

| | Example 1 | Example 2 | Example 3 | Comparison 4 | Comparison 5 |
|---|---|---|---|---|---|
| Density (kg/m$^3$) | 81.3 | 82.4 | 81.6 | 71.3 | 70.5 |
| Compressive strength (kpa) | 2.7 | 2.9 | 4.3 | 11.1 | 12.0 |
| Storage modulus (N/cm$^2$) | 5.9 | 6.7 | 7.8 | 12.9 | 13.8 |
| Loss factor | 0.65 | 0.61 | 0.53 | 0.22 | 0.19 |

The acoustic foams based on the polyol combination used according to the present invention have a very good foam structure and good flow. As a result of achieving a virtually pore-free surface, a very good surface adhesivity is obtained when using these polyols.

We claim:

1. A process for producing sound-absorbing polyurethane foams having an adhesive surface comprising reacting organic and/or modified organic polyisocyanates (a) with a polyetherol mixture (b) in the presence of water and/or other blowing agents (d), catalysts (e) and, optionally, further auxiliaries and additives (f), wherein the polyetherol mixture (b) comprises

- b1) at least one bifunctional to eight-functional polyetherol based on ethylene oxide and propylene oxide and having an OH number of from 20 to 80 mg KOH/g and a proportion of primary OH groups of >50%, where the proportion of ethylene oxide in the polyetherol is greater than 10% by weight, and at most 30% by weight,
- b2) at least one polyetherol based on ethylene oxide and a second alkylene oxide selected from the group consisting of propylene oxide, butylene oxide and mixtures thereof, and a bifunctional to eight-functional initiator and having an OH number of from 20 to 80 mg KOH/g, where the proportion of ethylene oxide in the polyetherol is >30% by weight, in amounts of from 10 to 50 parts by weight, and wherein the proportion of primary OH groups is >50%, and
- b3) at least one polyetherol based on propylene oxide and/or butylene oxide and optionally, ethylene oxide and a bifunctional to eight-functional initiator and having an OH number of from 30 to 400 mg KOH/g, where the proportion of ethylene oxide in the polyetherol is <30% by weight, and where the proportion of secondary OH groups is greater than 90%.

2. A process as claimed in claim 1, wherein b1) has a proportion of primary OH groups of >70%.

3. A process as claimed in claim 1, wherein b2) has a proportion of ethylene oxide of >50% by weight.

4. A process as claimed in claim 1, wherein b2) is used in an amount of from 20 to 50 parts by weight.

5. A process as claimed in claim 1, wherein b3) has a proportion of ethylene oxide of <5% by weight.

6. A process as claimed in claim 1, wherein the organic and/or modified organic polyisocyanates are selected from the group consisting of tolylene diisocyanate, mixtures of diphenylmethane diiusocyanate isomers, mixtures of diphenylmethane diisocyanate and polyphenylpolymethylene polyisocyanate tolylene diisocyanate with diphenylmethane diisocyanate, tolylene diisocyanate with polyphenylpolymethylene polyisocyanate and prepolymers formed by reaction of the abovementioned isocyanates with the polyetherols b1) to b3).

7. A sound absorbing polyurethane foam which has an adhesive surface comprising the reaction product of organic and/or modified organic polyisocyanates (a) with a polyetherol mixture (b) in the presence of water and/or other blowing agents (d), catalysts (e) and, optionally, further auxiliaries and additives (f), wherein the polyetherol mixture (b) comprises

- b1) at least one bifunctional to eight-functional polyetherol based on ethylene oxide and propylene oxide and having an OH number of from 20 to 80 mg KOH/g and a proportion of primary OH groups of >50%, where the proportion of ethylene oxide in the polyetherol is greater than 10% by weight, and at most 30% by weight,
- b2) at least one polyetherol based on ethylene oxide and a second alkylene oxide selected from the group consisting of propylene oxide, butylene oxide and mixtures thereof, and a bifunctional to eight-functional initiator and having an OH number of from 20 to 80 mg KOH/g, where the proportion of ethylene oxide in the polyetherol is >30% by weight, in amounts of from 10 to 50 parts by weight, and wherein the proportion of primary OH groups is >50%, and
- b3) at least one polyetherol based on propylene oxide and/or butylene oxide and optionally, ethylene oxide and a bifunctional to eight-functional initiator and having an OH number of from 30 to 400 mg KOH/g, where the proportion of ethylene oxide in the polyetherol is <30% by weight, and where the proportion of secondary OH groups is greater than 90%.

8. A sound-absorbing polyurethane foam as claimed in claim 7 which has an adhesivity of >30 N.

9. A sound-absorbing polyurethane foam as claimed in claim 7 which has a loss factor of >0.3.

10. A sound-absorbing polyurethane foam as claimed in claim 7, wherein the residual pores remaining on the foam surface have a diameter of >20 $\mu$m.

11. A polyetherol mixture (b) useful in production of sound absorbing polyurethane foams having an adhesive surface, wherein the polyetherol mixture comprises

- b1) at least one bifunctional to eight-functional polyetherol based on ethylene oxide and propylene oxide, having a propylene oxide block, an OH number of from 20 to 80 mg KOH/g and a proportion of primary OH groups of >50%,
- b2) at least one polyetherol based on ethylene oxide and a second alkylene oxide selected from the group consisting of propylene oxide, butylene oxide and mixtures thereof, and a bifunctional to eight-functional initiator and having an OH number of from 20 to 80 mg KOH/g, where the proportion of ethylene oxide in the polyetherol is >30% by weight, in amounts of from 10 to 50 parts by weight of the polyetherol mixture, and wherein the proportion of primary OH groups is >50%, and
- b3) at least one polyetherol based on propylene oxide and/or butylene oxide and optionally, ethylene oxide and a bifunctional to eight-functional initiator and having an OH number of from 30 to 400 mg KOH/g, where the proportion of ethylene oxide in the polyetherol is <30% by weight, and where the proportion of secondary OH groups is greater than 90%.

12. The polyetherol mixture of claim 11, wherein b1 comprises an ethylene oxide end cap.

13. The polyetherol mixture of claim 11, wherein b2 comprises an ethylene oxide end cap.

* * * * *